Dec. 15, 1964 G. W. OFFENSEND 3,161,105

STRIP FILM READER AND STORAGE DEVICE

Filed April 3, 1961 5 Sheets-Sheet 1

Glen W. Offensend
INVENTOR.

BY R. Frank Smith
Paul P. Holmes
ATTORNEYS

STRIP FILM READER AND STORAGE DEVICE

Filed April 3, 1961 5 Sheets-Sheet 2

Glen W. Offensend
INVENTOR.
BY R. Frank Smith
Paul R. Holmes
ATTORNEYS

Dec. 15, 1964 G. W. OFFENSEND 3,161,105

STRIP FILM READER AND STORAGE DEVICE

Filed April 3, 1961 5 Sheets-Sheet 3

Glen W. Offensend
INVENTOR.

BY R. Frank Smith
Paul R. Holmes
ATTORNEYS

Dec. 15, 1964 G. W. OFFENSEND 3,161,105

STRIP FILM READER AND STORAGE DEVICE

Filed April 3, 1961 5 Sheets-Sheet 4

Glen W. Offensend
INVENTOR.
BY R. Frank Smith
Paul R. Holmes
ATTORNEYS

Glen W. Offensend
INVENTOR.
BY R. Frank Smith
Paul P. Holmes
ATTORNEYS

United States Patent Office 3,161,105 Patented Dec. 15, 1964

3,161,105

STRIP FILM READER AND STORAGE DEVICE

Glen W. Offensend, Rochester, N.Y., assignor to Eastman Kodak Company, Rochester, N.Y., a corporation of New Jersey Filed Apr. 3, 1961, Ser. No. 100,172
11 Claims. (Cl. 88—24)

This invention relates to a strip film reader and more particularly to a film reader which is adapted to selectively receive strip storage devices containing a plurality of film strips, to advance selected film strips through the scanning station of the reader, and to scan images contained on such film strips.

The strip film reader of the present invention is especially useful for viewing images contained on microfilm and it was with such use in mind that this reader was originally designed. For this reason and in order to best illustrate the novel features of the present invention, it has been specifically illustrated in the drawings and will be described herein as it is adapted for this use. However, it will be apparent to those skilled in the art that the novel concepts embodied in the strip film reader and strip storage device could be used with similar facility and advantage in apparatus for viewing or scanning other types of strip material bearing visible images or other detectable information.

The difficulties involved in the retrieval of information which has been photographically recorded on film has been one of the factors which has discouraged the more extensive utilization of microfilm for permanent storage of such information. To retrieve information which has been recorded on roll film, it is helpful to utilize a code system, which must of necessity be quite complex to uniquely identify each information image, and a mechanism for passing the film through a sensing station where the code can be interpreted and correlated so that the desired image may be located. Apparatus of this type is expensive to manufacture and to maintain. Other record retrieval systems have utilized short strips of microfilm which are received in or printed on small cards, which cards may be positioned in a projection-type reader for viewing purposes. This system also presents several disadvantages. One is the difficulty that is involved in positioning the card in the reader so that the desired image is projected on the viewing screen. Another is the marking and scratching of the images on the card which occurs as a result of the handling and viewing. The strip film reader of the present invention provides an improved means for handling and scanning relatively short strips of film and avoids many of the difficulties encountered with the above-mentioned infor-fation retrieval systems. One aspect of the present invention is the novel combination of a strip storage device containing a plurality of slidably movable image bearing strips and a viewing apparatus having means for moving a selected one of said strips through the scanning station of the viewing apparatus for scanning selected images on the selected strip. Another aspect of the present invention is to provide in a viewing apparatus means for selectively receiving any one of a plurality of strip storage devices and including means for moving a selected one of the image bearing strips, contained in the selected storage device, in sandwiched relation between two transparent members through the scanning station in the viewer to thereby scan selected images on the selected strip.

The primary object of the present invention is, therefore, to provide a strip film reader and strip storage devices for use in combination therewith.

Another object of the present invention is to provide a viewing apparatus which is adapted to selectively receive strip storage devices each containing a plurality of slidably movable image bearing strips and which includes means for selectively moving the image bearing strips in image scanning relation to the optical projection system of the viewing apparatus.

Sill another object of the present invention is to provide a viewing apparatus which is adapted to receive a strip storage device containing a plurality of image bearing strips and to project for viewing images on a selected one of said strips, each selected strip being sandwiched between two relatively flat members during movement through the scanning station of the viewing apparatus.

Another object of the present invention is to provide a viewing apparatus which is adapted to receive a strip storage device containing a plurality of image bearing strips and to project for viewing selected images on a selected one of said strips, and wherein the viewing apparatus includes means for slidably moving the selected image bearing strip from the selected storage device and for sandwiching the strip between a pair of transparent members during movement through the scanning station of the viewing apparatus.

Yet another object of the present invention is to provide a viewing apparatus which is adapted to receive a strip storage device containing a plurality of image bearing strips and which includes means for locating selected images on any selected image bearing strip in viewing relation to the optical system of the apparatus.

Still other objects and advantages of the present invention will become readily apparent to those skilled in the art from the following description with reference to the drawings in which like characters denote like parts and wherein.

Figure 1:
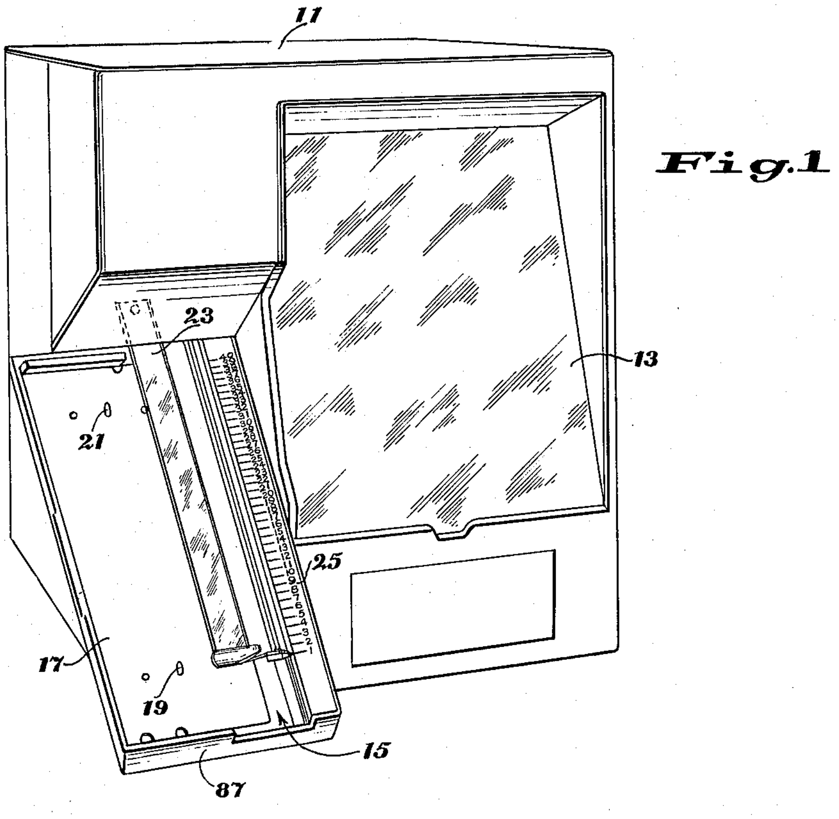
FIG. 1 is a picture view showing the strip film reader of my invention.

The strip film reader of the present invention as illustrated in FIG. 1 comprises a housing 11 which includes a viewing screen 13 recessed in the front face of the housing and a station 15 for selectively receiving strip storage devices such as envelope 17. The station 15 includes locating lugs 19 and 21 to facilitate properly positioning a strip storage device therein and a strip advancing mechanism 23 which operates in conjunction with an image position index 25 and is further illustrated in FIGS. 2 and 3.

The strip storage device comprises a three-ply laminated envelope 17, preferably formed of fiberboard, plastic sheeting, paper or the like, the inner ply 31 of which is formed with four channels that are slightly wider than the width of the film strips to be slidably received therein and which are slightly longer than the over-all length of the film strips, so that each of the four film strips to be positioned in the envelope is substantially enclosed between outer plies 33 and 35 thereof. Two channels 37 and 39 extend from one end of the envelope 17 and two other channels 41 and 43 extend from the other end of the envelope. These channels do not communicate with each other and each channel is adapted to receive only one film strip. Within the channels 37 through 43 is located a film strip F1, F2, F3, and F4, respectively. The outer plies 33 and 35 are formed with recesses 45, 47, 49 and 51 at the entrant portions of the channels so as to expose an end of the film strips which are contained in the respective channels. That end of each film strip is provided with an opening $53_1$, $53_2$, $53_3$, and $53_4$, respectively, which enables the film strips to be engaged by suitable means in the strip film reader and slidably moved with respect to the envelope 17 for viewing. In addition, each envelope 17 includes three sets of openings 55 and 57 which are formed between adjacent channels and are equally spaced from the respective channels. These openings cooperate with the locating lugs 19 and 21 in the receiving station 15 to orient a selected image bearing strip in proper relation to the scanning station of the reader in a manner which will be hereinafter more fully set forth.

The station 15 is provided on a member 61, the upper surface of which forms a relatively flat inclined shelf for receiving the envelope 17. A channel 63 which extends throughout the length of member 61 receives a rigid platen 65 for sliding movement therein. The platen 65 is longer than the length of the film strips which are contained in the channels 37 through 43 in envelope 17. The station 15 also includes a flexible platen 67 which is adapted to move simultaneously with the rigid platen 65 as will be hereinafter set forth. Platen 67 is about the same length as the film strips but is slightly shorter than platen 65. The flexible platen 67 is attached at its opposite ends to a plate 69 which, in turn, is pivotally connected to a slide 71. The slide 71 is mounted for movement with respect to the member 61 in an undercut groove 73 in a direction parallel to the position occupied by the film strips F1 through F4 when the envelope 17 is positioned over lugs 19 and 21 in the station 15. The balls 75 and 77 are retained in cylindrical bores formed in the slide 71 as, for example, by means of the retainers 79 and 81, and permit the flexible platen 67 and the plate 69 to be pivoted between raised positions such as indicated by the dotted lines $P_1$ and $P_2$ in FIG. 7 to a position overlying the envelope 17 in station 15. In order to position the envelope 17 in the receiving station 15, it is first necessary to move the flexible platen 67 and slide 71 to its lowermost position in member 61; that is, the position at which the handle 83 on plate 69 and handle 85 on slide 71 are adjacent to the lowermost end 87 of member 61. Then, the flexible platen 67 and plate 69 can be pivoted about balls 75 and 77 to the positions $P_1$ or $P_2$ and then the envelope 17 can be placed over the lugs 19 and 21 as desired in the station 15.

Figure 2:
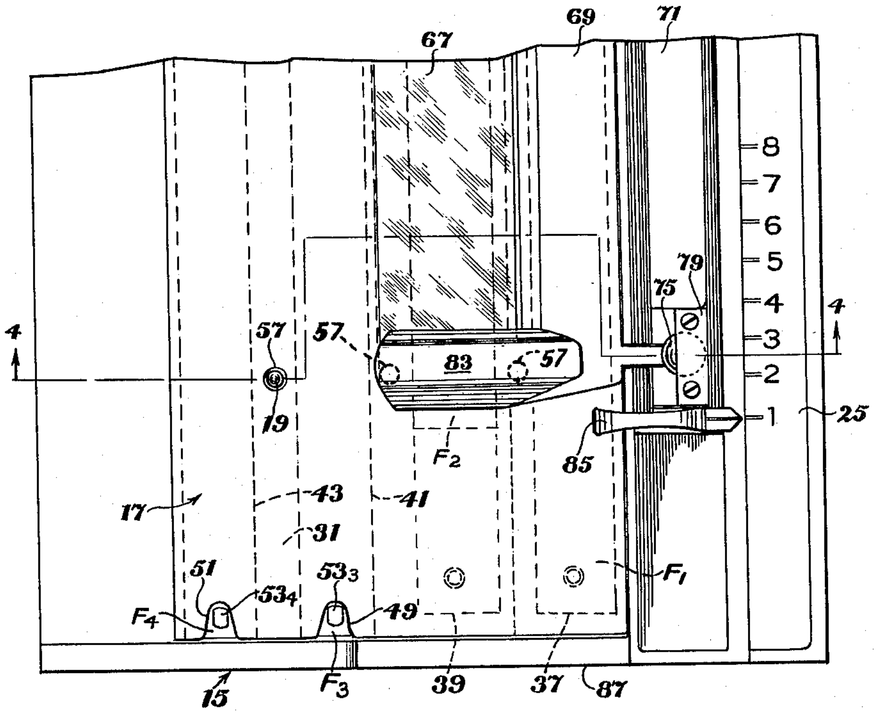
FIG. 2 and FIG. 3 are top plan views further showing the station at which the strip storage device is located when used in accordance with the present invention.

A pin 91 is affixed to the upper end of the flexible platen 67 and is adapted to engage one of the openings 53 in the film strips contained in the envelope 17. The pin 91 extends through the opening 53 and engages a hole 93 formed in the rigid platen 65. Thus, when the slide 71 and flexible platen 67 are moved with respect to the station 15, the rigid platen 65 and also the film strip which is engaged by pin 91 will simultaneously move therewith as a unit. The end of the plate 69 to which upper end of the flexible platen 67 is attached, also includes a key 95 which engages a key-way 97 formed in the rigid platen 65 so that a more secure connection between the flexible platen and the rigid platen is obtained. After the film strip $F_2$, for example, has been engaged by the pin 91 and the slide 71 is moved up to the first index position, as indicated in FIG. 2, so that handle 85 is opposite the numeral 1, the first image on the film strip is positioned in the scanning station 99 of the strip film reader and that image is projected by the optical projection system onto the viewing screeen 13.

Figures 4, 5:
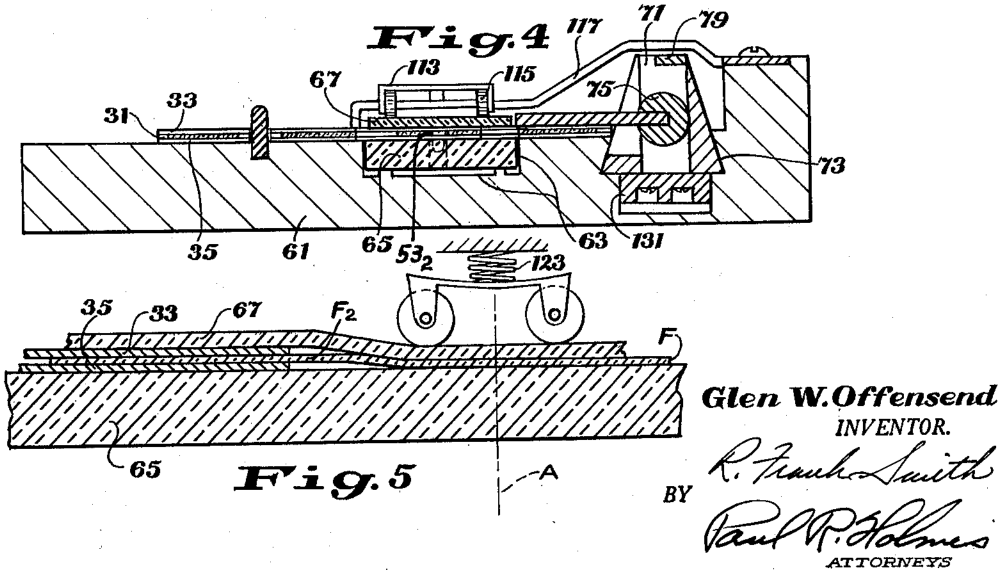
FIG. 4 is a cross-sectional view taken along line 4—4 of FIG. 2.
FIG. 5 is a schematic view illustrating the position taken by the image bearing strip and other elements of the strip advancing mechanism during scanning of the images carried on the strip.
Figures 3, 6:
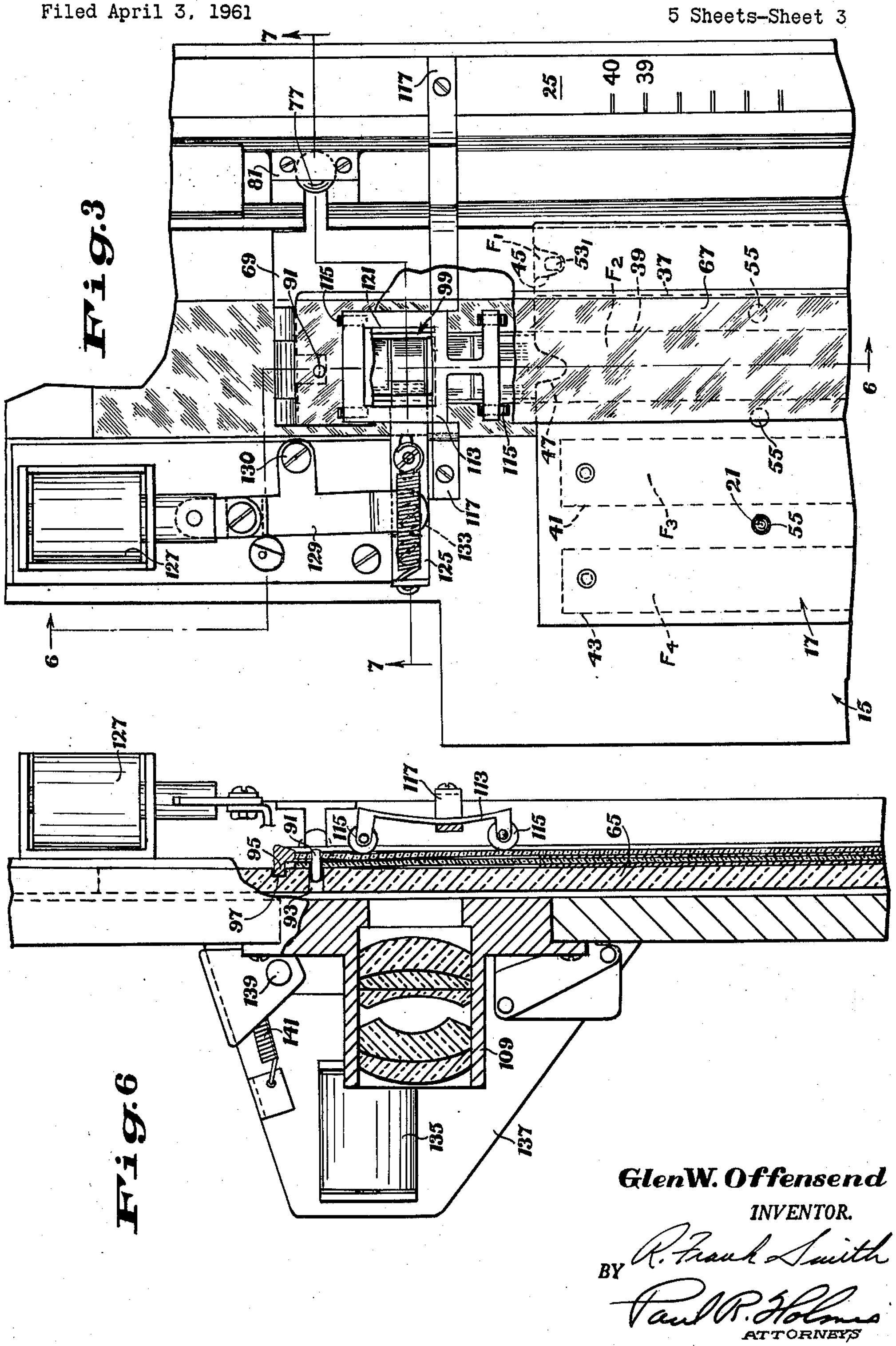
FIG. 6 is a sectional view taken generally along the line 6—6 of FIG. 3.
Figure 7:
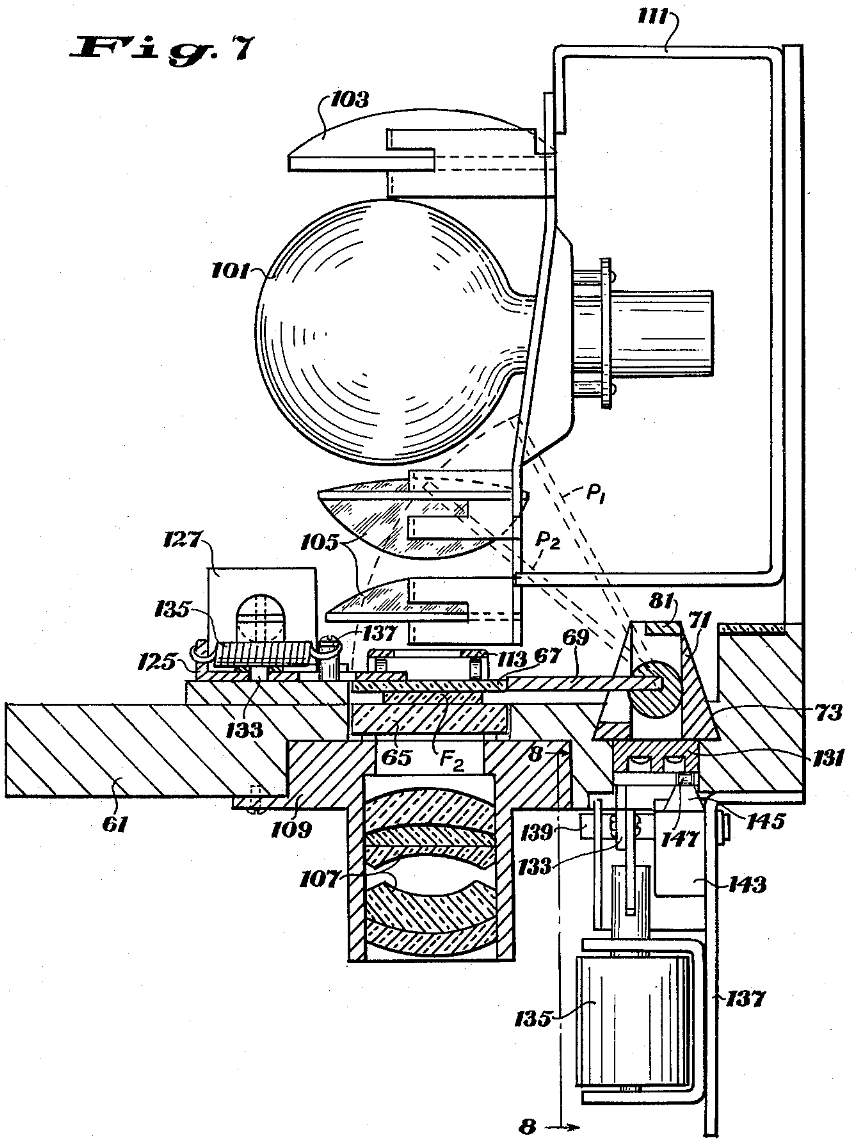
FIG. 7 is a sectional view taken along line 7—7 in FIG. 3.

Referring to FIGS. 3, 6, and 7, it will be seen that the optical projection system comprises a projection lamp 101, a reflector 103, a pair of condensing lenses 105 and a series of projection lenses 107, which projection lenses are mounted within the lens housing 109. The reflector, projection lamp, and condenser lenses are mounted in a supporting bracket 111 in fixed relation to the member 61, and are positioned in optical alignment with the projection lenses 107. A dolly 113 having wheels 115 is mounted over the projection lenses 107 by means of a bracket 117 which is fixed in proper relation to the scanning station 99 on the member 61. The dolly is made from a relatively resilient and flexible metal sheet and is attached to the bracket 117 in such a way that the wheels 115 are forced by the resiliency of the dolly toward the upper surface of the rigid platen 65. Thus, when the flexible platen, film strip and rigid platen are moved into image projecting relation to the projection lenses 107, the wheels of the dolly urge the flexible platen 67 into close sandwiching relation to the film strip and rigid platen. This ensures that the images on the film strip when in the scanning station 99 are located for proper focus on the viewing screen 13. A substantially square aperture 121 is formed in the dolly 113 to permit light from the lamp 101 to pass through the dolly and through the film images when positioned in the scanning station 99 in optical alignment with the projection lenses 107. The relationship of the film strip, the flexible platen 67 and the rigid platen 65 is schematically illustrated in FIG. 5. In that figure, the optical axis of the projection system is indicated by the line A and the resiliency of the flexible dolly is illustrated by a coil spring 123.

The strip film reader and strip storage device of the present invention is well adapted for use as a self-teaching machine. Accordingly, each recorded image on each film strip could include a question and an answer and successive questions would be programmed to facilitate the learning process. It is desirable to selectively mask the answer portion of each image so that when first projected onto the viewing screen 13 only the question is visible and then one can selectively remove the mask to see both the answer and the question on the screen. Thus, the strip film reader as shown in FIG. 3 and FIG. 7 comprises a shutter member 125 which is mounted for slidable movement with respect to member 61 and in a direction transverse to the direction of movement of the film strip through the scanning station 99. Movement of the shutter member 125 is controlled by a solenoid 127 through a mechanical linkage which includes a bell crank lever 129 that pivots about a screw 130 and is connected to the shutter member 125 by a pin 133. A tension spring 135 which is attached at one end to the shutter member 125 and at the other end is attached to a rigid post 137, acts to return the shutter member to the position at which it covers the answer portion of the image on the film strip and simultaneously returns the solenoid 127 to its de-energized position.

Figure 8:
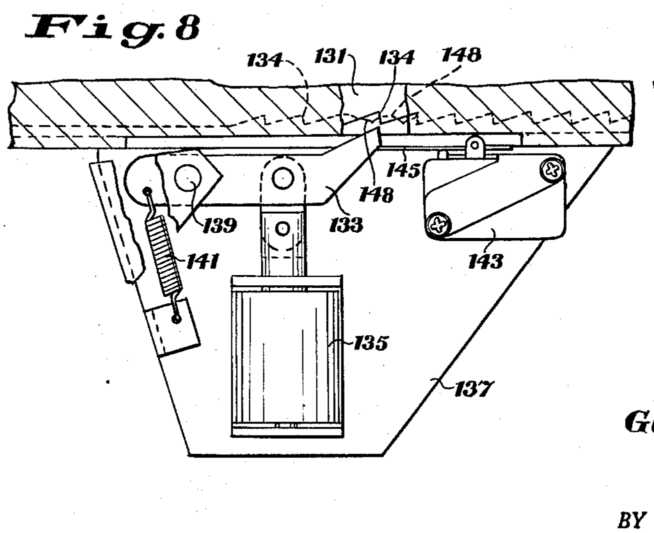
FIG. 8 is a sectional view taken along line 8—8 of FIG. 7.
Figure 9:
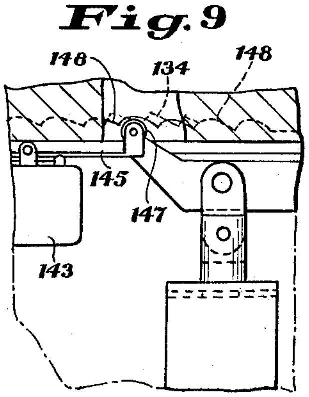
FIG. 9 is a view showing the same elements illustrated in FIG. 8 but showing the other side thereof.

In a viewing apparatus of the type which is disclosed herein, it is desirable to provide an index which will enable the operator to correlate a particular image on the film strips to a given position of the slide 71. This is accomplished by utilizing a pointer formed on the handle 85 of the slide in conjunction with the position index 25 which is coordinated with position of the images on the film strips. It is often desirable to automatically lock the slide so that it can be advanced only one index position at a time. For this purpose, a ratchet 131 is mounted on the bottom of the slide 71 and a pawl 133 is arranged to selectively engage the ratchet teeth 134, see FIGS. 6, 7, 8, and 9. A solenoid 135 is mounted on a bracket 137 adjacent to the lens housing 109. The solenoid is connected by a suitable lever to the pawl 133 which, in turn, is pivoted about a pin 139. The pin is supported in U-shaped portion of bracket 137. A spring 141 which is connected on one end to the bracket 137 and at the other end to the remote end of pawl 133 serves to return the pawl 133 into engagement with ratchet 131 when the solenoid 135 is de-energized. The microswitch 143 operates in conjunction with solenoids 127 and 135 as will be hereinafter set forth. At this point, however, it should be noted that the switch arm 145 carries a roller 147 which rolls in engagement with the rounded teeth 148 which are formed on the side of ratchet 131 opposite the ratchet teeth 134. The teeth 148 are off-set in longitudinal position with respect to the ratchet teeth 134 as best illustrated in FIGS. 8 and 9. In this way the switch 143 is tripped before the pawl 133 reaches the position where it should be engaging the next ratchet tooth and such engagement is ensured. Reference to the wiring diagram of FIG. 10 will further clarify this part of the operation of the apparatus.

Figure 10:
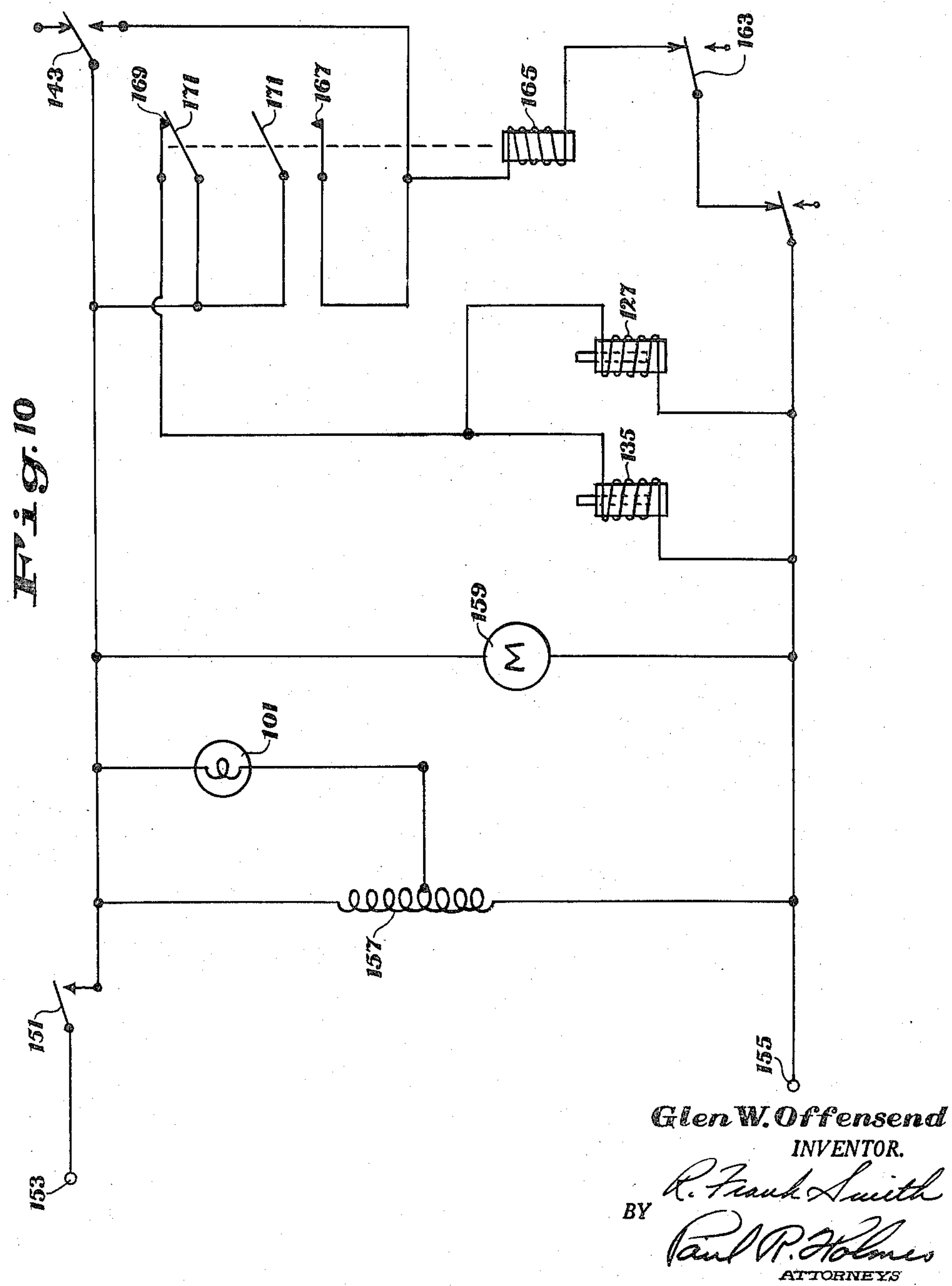
FIG. 10 is a schematic wiring diagram which further illustrates the operation of the strip film reader of the present invention.

In FIG. 10 the numeral 151 designates the main On-Off switch of the apparatus and the numerals 153 and 155 designate the terminals across which a 117 volt A.C. supply is connected. A transformer 157 and a motor 159 which drives the cooling fan for the projection lamp 101 are connected across the supply. The projector lamp 101 is adjustably connected to the transformer so that the intensity of the lamp can be controlled. The numeral 163 designates an answer switch and the numeral 165 designates a relay having stationary contacts 167 and 169 and movable contacts 171. The operation of the apparatus is as follows: When the main switch 151 is closed, the projection lamp 101 is lit and the motor for the lamp cooling fan 159 is energized. As the operator advances slide 71 so that the handle 85 approaches index position 1 and thereby simultaneously advances the first image frame on the film strip engaged by the pin 91 to the vicinity of the scanning station 99, the roller 147 associated with microswitch 143 engages the first tooth 148 on the ratchet 131, thereby closing the microswitch 143 and causing relay 165 to be energized. The energization of relay 165 causes the movable contact 171 to close with respect to contact 167 and to open with respect to contact 169. Thus, the circuits through solenoids 127 and 135 are opened and the shutter 125 is moved over the answer portion of the image on the film strip by the spring 135, and the pawl 133 is moved into position for engaging the teeth 134 of ratchet 131 by the tension spring 141. At the same time, the electrical circuit through relay 155 is completed through its own contacts 167 and 171. As the handle 85 arrives at the index position 1, further movement of the slide 71, and, therefore, the film strip, is prevented by the engagement of pawl 133 with ratchet tooth 134. At the same time, the roller 147 has now progressed to the point where the microswitch 143 is allowed to open. The relay 165 does not drop out, however, because of the circuit through its contacts 167 and 171 and the answer portion of the image is covered by shutter member 125. After the operator has read the question portion of the image on screen 13 and has determined the appropriate answer thereto, he depresses the switch 163 which thereby opens the circuits to the relay 165 causing the movable contact 171 to close with the contact 169. At this time, both solenoids 127 and solenoid 135 are energized, the shutter member 125 is withdrawn from the answer portion of the film image permitting the same to be projected onto the viewing screen 13, and the pawl 133 is retracted from engagement with the ratchet tooth 134 so that the slide 71 can be advanced to the next index position and the cycle repeated.

It will now be appreciated by those skilled in the art that the viewing apparatus of the present invention provides a very satisfactory means for viewing selected images on short film strips that are contained in individual channels in strip storage devices, and that a novel apparatus for receiving such storage devices and for transporting and handling the film strips contained therein is provided. While only one embodiment of the present invention has been specifically illustrated and described it is realized that many modifications and variations are possible and will be readily apparent to those skilled in the art from the foregoing description which is intended, therefore, to be illustrative only and the scope of the invention is defined in the appended claims.

Having now particularly described my invention, what I desire to secure by Letters Patent of the United States and what I claim is:

1. The combination comprising a strip storage device having a plurality of channels which slidably carry a plurality of image-bearing strips respectively therein, a viewing apparatus having a station for receiving said storage device and a station for scanning selected images on said strips, means in said receiving station for locating said device in a position in which a selected one of said strips is aligned with said scanning station, and means in said storage device uniformly spaced respectively from each of said channels for engagement with said locating means to selectively position any one of said strips in aligned relation to said scanning station.

2. The combination in accordance with claim 1 and wherein said locating means comprises a lug which is upstanding in said receiving station and wherein said engagement means comprises a plurality of openings formed in the storage device between said channels, whereby the engagement of said lug with one of said openings locates the channel associated with said one opening in said receiving station with the strip in that channel aligned with said scanning station.

3. The combination in accordance with claim 1 and wherein said strip engaging means comprises a surface underlying said selected strip for supporting the same during movement through said scanning station, a member positioned in overlying relation to said surface and said selected strip during such movement, and means for operatively interconnecting said surface, said selected strip and said member to move as a unit during scanning movement of said selected strip in said station.

4. The combination in accordance with claim 3 and wherein said storage device is formed of three laminated plies, the inner one of which is provided with said plurality of channels which open on at least one end of said member to receive said plurality of strips respectively therein.

5. The combination in accordance with claim 4 and wherein said channels are sufficient in length to accommodate the full length of said strips whereby said strips are substantially enclosed by said device.

6. A viewing apparatus for use with strip storage devices containing a plurality of image bearing strips which are slidably movable in respective strip receiving channels in the devices, said apparatus comprising a station for scanning selected images on a selected one of said strips, and a station for receiving a selected device which contains said selected strip, said receiving station comprising means for locating said selected device in a position at which said selected strip is aligned with said scanning station, means movable into overlying relation to said selected device for holding said selected device in said position, and means for engaging the selected strip within its channel and for slidably moving said selected strip relative to said selected device and through said scanning station in image scanning relation thereto.

7. A viewing apparatus comprising a station for scanning selected images carried on an image bearing strip, means for locating a strip storage device, containing a plurality of slidably mounted image bearing strips, to align a selected strip with said station, means for supporting said selected strip during sliding movement with respect to said storage device and during movement through said station in scannnig relation thereto, a member pivotally mounted on said apparatus at one side of said station for movement between a first position spaced from said locating means to facilitate positioning of said storage device in and removal from said apparatus and a second position overlying said selected strip for confining the same between said member and said supporting means, and means for operatively interconnecting said member, said strip and said supporting means to move as a unit during scanning movement of said selected strip in said station.

8. A viewing apparatus in accordance with claim 7 and wherein said member is at least coextensive in length with the image bearing portions of said strips whereby said selected strip when in said station is sandwiched between said supporting means and said member.

9. A viewing apparatus in accordance with claim 8 and wherein said supporting means comprises a rigid platen having a strip supportnig surface which is at least coextensive in area with the image bearing portions of said strips, wherein said member is flexible throughout its length, and wherein said apparatus includes adjacent to said station means for urging said member toward said supporting surface whereby those portions of said selected strip which are removed from said storage device during scanning are constrained between said supporting surface and said member to facilitate the handling and return of said selected strip into said storage device.

10. A viewing apparatus in accordance with claim 9 and wherein both said platen and said member are transparent and said selected images on said selected strip are scanned in said station through said platen and said member.

11. A viewing apparatus in accordance with claim 10 and wherein said platen and said strips have openings provided adjacent to an end thereof and said interconnecting means comprises a pin fixed on said member and located for engagement with the opening in said platen and the opening in said selected strip upon engaging the storage device containing said selected strip with said locating means.

References Cited in the file of this patent

UNITED STATES PATENTS

| | | |
|---|---|---|
| 2,326,042 | Lessman | Aug. 3, 1943 |
| 2,559,858 | Elle et al. | July 10, 1951 |
| 2,701,979 | Pratt et al. | Feb. 15, 1955 |
| 2,892,295 | McArthur | June 30, 1959 |
| 2,922,333 | Subach et al. | Jan. 26, 1960 |
| 2,982,176 | Kay | May 2, 1961 |

OTHER REFERENCES

Litz, F. A.: "Part I: Prototype Machine System, Direct Access Photomemory," in Proceedings of the Western Joint Computer Conference: (Los Angeles, Calif., May 6–8, 1958), published March 1959, American Institute of Electrical Engineers, 33 W. 39th, New York 18, N.Y., pages 50–53.